(12) United States Patent
Nakamura et al.

(10) Patent No.: US 12,625,031 B2
(45) Date of Patent: May 12, 2026

(54) DEVICE, METHOD AND SYSTEM FOR CALCULATING POWER COUPLING COEFFICIENTS BETWEEN CORES

(71) Applicant: NTT, Inc., Tokyo (JP)

(72) Inventors: Atsushi Nakamura, Musashino (JP); Yusuke Koshikiya, Musashino (JP); Nazuki Honda, Musashino (JP)

(73) Assignee: NTT, Inc., Tokyo (JP)

( * ) Notice: Subject to any disclaimer, the term of this patent is extended or adjusted under 35 U.S.C. 154(b) by 90 days.

(21) Appl. No.: 18/580,408

(22) PCT Filed: Aug. 2, 2021

(86) PCT No.: PCT/JP2021/028654
§ 371 (c)(1),
(2) Date: Jan. 18, 2024

(87) PCT Pub. No.: WO2023/012875
PCT Pub. Date: Feb. 9, 2023

(65) Prior Publication Data
US 2024/0344928 A1 Oct. 17, 2024

(51) Int. Cl.
*G01M 11/00* (2006.01)
*G01M 11/02* (2006.01)
*G02B 6/02* (2006.01)

(52) U.S. Cl.
CPC .......... *G01M 11/331* (2013.01); *G01M 11/02* (2013.01); *G01M 11/333* (2013.01); *G02B 6/02* (2013.01)

(58) Field of Classification Search
CPC ............... G01M 11/331; G01M 11/02; G01M 11/333; G02B 6/02
See application file for complete search history.

(56) References Cited

U.S. PATENT DOCUMENTS

2013/0039627 A1* 2/2013 Li ...................... G02B 6/02042
385/126
2013/0251320 A1* 9/2013 Hayashi ............... G02B 6/4401
385/100

(Continued)

FOREIGN PATENT DOCUMENTS

WO WO-2019/198365 A1 10/2019

OTHER PUBLICATIONS

M. Nakazawa, M. Yoshida, and T. Hiraoka, "Nondestructive measurement of mode couplings along multi-core fiber using a synchronous multi-channel OTDR", Optics Express, vol. 20, No. 11, pp. 12530-12540, 2012.

(Continued)

*Primary Examiner* — Dominic J Bologna
(74) *Attorney, Agent, or Firm* — Harness, Dickey & Pierce, 1P.L.C.

(57) ABSTRACT
A device according to the present disclosure: acquires a group delay time difference between eigenmodes, at a specific wavelength, in a coupled two-core fiber; acquires spatial mode dispersion between the eigenmodes, at the specific wavelength, in the coupled two-core fiber; and calculates an average power coupling coefficient between cores, at the specific wavelength, within an entire length of the coupled two-core fiber by using the group delay time difference, the spatial mode dispersion, and a length of the coupled two-core fiber.

4 Claims, 2 Drawing Sheets

[1]

(56)                References Cited

U.S. PATENT DOCUMENTS

| | | | |
|---|---|---|---|
| 2016/0266307 A1* | 9/2016 | Hayashi | G02B 6/4413 |
| 2017/0102501 A1* | 4/2017 | Hayashi | G02B 6/268 |
| 2018/0038769 A1* | 2/2018 | Hayashi | G01M 11/3109 |
| 2021/0003774 A1* | 1/2021 | Hayashi | G02B 6/03627 |

OTHER PUBLICATIONS

M. Ohashi, K. Kawazu, A. Nakamura, and Y. Miyoshi, "Simple backscattered power technique for measuring crosstalk of multi-core fibers", in Proceedings of the 17th Opto-Electronics and Communications Conference (OECC), pp. 357-358, 2012.

T. Sakamoto et al., "Nondestructive measurement of mode couplings along multi-core fiber using a synchronous multi-channel OTDR", Proceedings of the Institute of Electronics, Information and Communication Engineers (IEICE) General Conference p. 506, 2015 with machine generated English translation thereof.

T. Sakamoto, T. Mori, M. Wada, T. Yamamoto, F. Yamamoto, and K. Nakajima, "Strongly-coupled multi-core fiber and its optical characteristics for MIMO transmission systems", Optical Fiber Technology, vol. 35, pp. 8-18, 2017.

C. D. Poole, "Statistical treatment of polarization dispersion in single-mode fiber", Optics Letters, vol. 13, No. 8, pp. 687-689, 1998.

* cited by examiner

[1]

DEVICE, METHOD AND SYSTEM FOR CALCULATING POWER COUPLING COEFFICIENTS BETWEEN CORES

CROSS-REFERENCE TO RELATED APPLICATIONS

This application is a 371 U.S. National Phase of International Application No. PCT/JP2021/028654, filed on Aug. 2, 2021. The entire disclosure of the above application is incorporated herein by reference.

TECHNICAL FIELD

The present disclosure relates to a technique for calculating a power coupling coefficient between cores in a coupled two-core fiber.

BACKGROUND ART

A coupled multicore fiber is one of promising optical fibers as a medium for achieving future large-capacity optical communication. Important characteristics, such as an inter-mode loss difference, an inter-mode delay time difference, and a non-linear characteristic, in the coupled multicore fiber depend on a coupling degree of light intensity between cores. Thus, for optimizing design and grasping transmission characteristics of the coupled multicore fiber, it is important to grasp a power coupling coefficient representing the coupling degree of the light intensity between the cores. In particular, grasping the coupling degree in a coupled two-core fiber is important for designing the coupled multicore fiber having three or more cores and for grasping a transmission path.

In Non Patent Literature 1 and Non Patent Literature 2, methods for measuring a power coupling coefficient of a non-coupled multicore fiber are disclosed. In these methods, backscattered light intensities, from a specific core and an adjacent core thereof, resulting from a test light pulse injected into the specific core are measured, and the power coupling coefficient is calculated from a ratio between the backscattered light intensities.

The methods of Non Patent Literature 1 and Non Patent Literature 2 can also be applied to measurement of the power coupling coefficient of the coupled multicore fiber on the measurement principle thereof.

On the other hand, by the power coupling coefficient of the coupled multicore fiber, which is extremely larger than the power coupling coefficient of the non-coupled multicore fiber, backscattered light intensities from one specific core that the test light pulse is injected into and an adjacent core thereof are caused to become equal to each other once the test light pulse propagates about several meters to several tens of meters. In such a case, in the methods of Non Patent Literature 1 and Non Patent Literature 2, a power coupling coefficient can be obtained only within a section of about several meters to several tens of meters, namely, until equality between the backscattered light intensities of the cores. That is, there is a problem that the power coupling coefficient within an entire length of a long optical fiber cannot be measured.

CITATION LIST

Non Patent Literature

Non Patent Literature 1: M. Nakazawa, M. Yoshida, and T. Hirooka, "Nondestructive measurement of mode couplings along multi-core fiber using a synchronous multi-channel OTDR," Optics Express, vol. 20, no. 11, pp. 12530-12540, 2012.

Non Patent Literature 2: M. Ohashi, K. Kawazu, A. Nakamura, and Y. Miyoshi, "Simple backscattered power technique for measuring crosstalk of multi-core fibers," in Proceedings of the 17th Opto-Electronics and Communications Conference (OECC), pp. 357-358, 2012.

Non Patent Literature 3: Sakamoto et al., "Nondestructive measurement of mode couplings along multi-core fiber using a synchronous multi-channel OTDR," Proceedings of the Institute of Electronics, Information and Communication Engineers (IEICE) General Conference p. 506, 2015.

Non Patent Literature 4: T. Sakamoto, T. Mori, M. Wada, T. Yamamoto, F. Yamamoto, and K. Nakajima, "Strongly-coupled multi-core fiber and its optical characteristics for MIMO transmission systems," Optical Fiber Technology, vol. 35, pp. 8-18, 2017.

Non Patent Literature 5: C. D. Poole, "Statistical treatment of polarization dispersion in single-mode fiber," Optics Letters, vol. 13, no. 8, pp. 687-689, 1998.

SUMMARY OF INVENTION

Technical Problem

To solve the above problem, an object of the present disclosure is to provide a device, a method, and a system for calculating an average power coupling coefficient between cores within an entire length of a coupled two-core fiber, which is even a long coupled two-core fiber.

Solution to Problem

Specifically, a device according to the present disclosure:

acquires a group delay time difference between eigen-modes, at a specific wavelength, in a coupled two-core fiber;

acquires spatial mode dispersion between the eigen-modes, at the specific wavelength, in the coupled two-core fiber; and calculates an average power coupling coefficient between cores, at the specific wavelength, within an entire length of the coupled two-core fiber by using the group delay time difference, the spatial mode dispersion, and a length of the coupled two-core fiber.

Specifically, a method according to the present disclosure includes:

acquiring a group delay time difference between eigen-modes, at a specific wavelength, in a coupled two-core fiber;

acquiring spatial mode dispersion between the eigen-modes, at the specific wavelength, in the coupled two-core fiber; and calculating an average power coupling coefficient between cores, at the specific wavelength, within an entire length of the coupled two-core fiber by using the group delay time difference, the spatial mode dispersion, and a length of the coupled two-core fiber.

Specifically, a system according to the present disclosure includes:

a group delay time difference acquisition device that acquires a group delay time difference between eigen-modes, at a specific wavelength, in a coupled two-core fiber;

a spatial mode dispersion acquisition device that acquires spatial mode dispersion between the eigenmodes, at the specific wavelength, in the coupled two-core fiber; and a power coupling coefficient calculation device that calculates an average power coupling coefficient between cores, at the specific wavelength, within an entire length of the coupled two-core fiber by using the group delay time difference, the spatial mode dispersion, and a length of the coupled two-core fiber, and calculates a power coupling coefficient between cores.

Advantageous Effects of Invention

According to the present disclosure, it is practicable to provide a device, a method, and a system for calculating an average power coupling coefficient between cores within an entire length of a coupled two-core fiber, which is even a long coupled two-core fiber.

DESCRIPTION OF EMBODIMENTS

Figure 1:
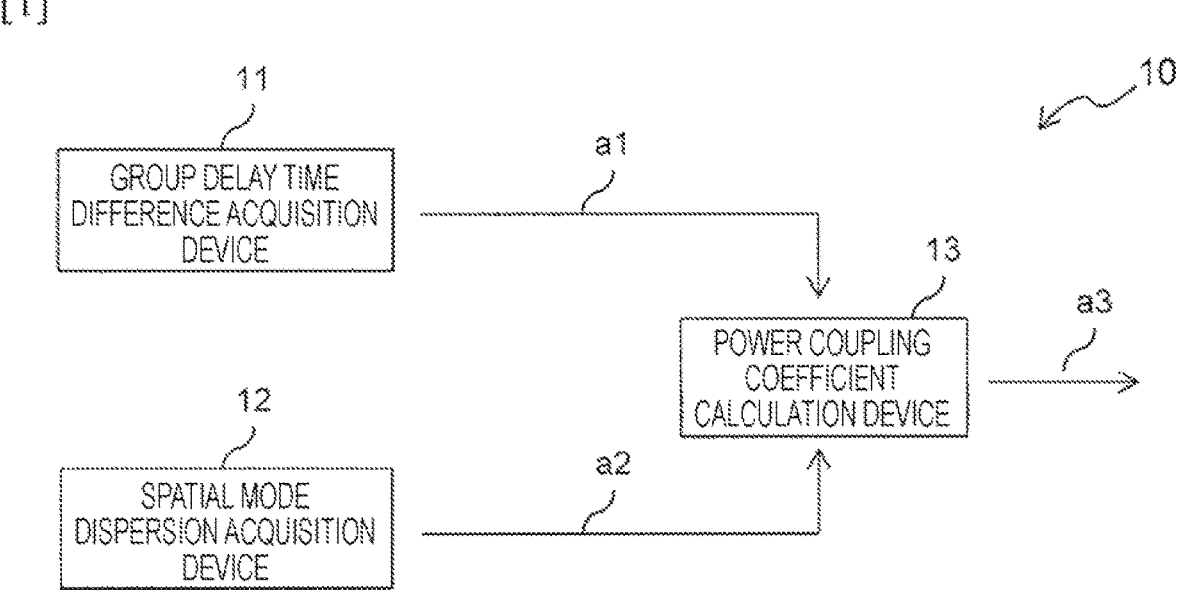
FIG. 1 illustrates an example of a schematic configuration of a system according to an embodiment.

Hereinafter, embodiments of the present disclosure will be described in detail with reference to the drawings. Note that the present disclosure is not limited to the embodiments described below. These embodiments are merely examples, and the present disclosure can be carried out in forms with various modifications and improvements based on the knowledge of those skilled in the art. Note that components having the same reference numerals in the present specification and the drawings denote the same components.

EMBODIMENT

FIG. 1 illustrates an example of a schematic configuration of a system that calculates a power coupling coefficient between cores according to the present embodiment. A system 10 that calculates a power coupling coefficient between cores includes: a group delay time difference acquisition device 11 that acquires a group delay time difference between eigenmodes; a spatial mode dispersion acquisition device 12 that acquires spatial mode dispersion between the eigenmodes, and a power coupling coefficient calculation device 13 that calculates an average power coupling coefficient between cores within an entire length of a coupled two-core fiber under measurement.

In the present embodiment, the coupled two-core fiber is an optical fiber to be tested. Each of the two cores constituting the coupled two-core fiber is a single mode core propagating only a fundamental mode. The optical fiber to be tested is not limited thereto as long as it is an optical fiber having two modes. In the present embodiment, an even mode and an odd mode generated by coupling fundamental modes individually corresponding to the two cores of the coupled two-core fiber will be described as eigenmodes of the coupled two-core fiber. Note that, as described later, a mode 1 in which only a fundamental mode of a core 1 is excited and a mode 2 in which only a fundamental mode of a core 2 is excited may be set as the eigenmodes.

The power coupling coefficient calculation device 13 receives information a1 on the group delay time difference and information a2 on the spatial mode dispersion, calculates the power coupling coefficient by using these pieces of information and Math. 1, which is an evaluation expression of the power coupling coefficient, and outputs information a3 on the power coupling coefficient. The information a1 is information on the group delay time difference between the eigenmodes in the coupled two-core fiber. The information a2 is information on the spatial mode dispersion between the eigenmodes in the coupled two-core fiber. The information a1 and the information a2 are acquired at each wavelength where the power coupling coefficient to be obtained.

A description will be given in regards to Math. 1, which is the evaluation expression of the power coupling coefficient for calculating the power coupling coefficient between cores from the group delay time difference and the spatial mode dispersion. When there is no coupling between the eigenmodes in the optical fiber, an impulse response width is widened in proportion to a distance. On the other hand, when coupling between the eigenmodes frequently occurs in the optical fiber, the impulse response width, as well as a polarization mode dispersion, is proportional to a square root of the distance. For this reason, a width (spatial mode dispersion) of a light pulse output from one end of a certain core of the coupled two-core fiber, when an impulse is injected into the other end, can be derived in a procedure similar to that of derivation of the polarization mode dispersion in a single mode fiber, as described later, and can be expressed by Expression (1) (See Expression (11b) in Non Patent Literature 5).

[Math. 1]

$$\Delta\tau = \frac{d\Delta\beta}{d\omega}\sqrt{\frac{L}{h}} \tag{1}$$

Here, $\Delta_\tau$ represents spatial mode dispersion between the eigenmodes, at a specific wavelength, in the coupled two-core fiber, $d\Delta\beta/d\omega$ represents a group delay time difference between the eigenmodes, at the specific wavelength, in the coupled two-core fiber, L represents a fiber length of the coupled two-core fiber, and h represents a power coupling coefficient. In addition, $\Delta\beta$ represents a propagation constant difference between the eigenmodes, and $\omega$ represents an optical frequency.

The fiber length L is a certain length in which the impulse response width is widened in proportion to the square root of the distance. In the present embodiment, the length is a length of a coupled two-core fiber in which coupling between the eigenmodes frequently occurs, and a product of the power coupling coefficient h and the fiber length L is sufficiently larger than 1. Usually, a length equal to or longer than 1 km is sufficient.

In the two-core fiber, space dependence of an electric field having an electric field $E_1$ of the mode 1, in which only the fundamental mode of the core 1 is excited, and an electric field $E_2$ of the mode 2, in which only the fundamental mode of the core 2 is excited, as components is expressed by the following expression.

[Math. 2]

$$\frac{d}{dz}\begin{pmatrix} E_1 \\ E_2 \end{pmatrix} = -i\begin{pmatrix} \beta & \kappa \\ \kappa^* & \beta \end{pmatrix}\begin{pmatrix} E_1 \\ E_2 \end{pmatrix} \tag{2}$$

Here, β represents a propagation coefficient, and κ represents a coupling coefficient.

When calculation is performed in accordance with a procedure, described in the cited literature 5, starting from Expression (2), Expression (11b) of the cited literature 5 can be derived. Expression (11b) of the cited literature 5 corresponds to Math. 1 in the present embodiment, and $\delta_\tau$, $\Delta\beta'$, z, and h, in Expression (11b) of the cited literature 5, correspond to $\Delta_\tau$, $d\Delta\beta/d\omega$, L, and h of Math. 1, respectively. Note that, since Math. 1 derived in accordance with the procedure, described in the cited literature 5, starting from Expression (2) is calculated by using the electric fields $E_1$ and $E_2$ of the mode 1 and the mode 2, $\Delta_\tau$ and $d\Delta\beta/d\omega$ of Expression (1) represent a spatial mode dispersion and a group delay time difference between the mode 1 and mode 2.

On the other hand, when the following expression is used, the group delay time difference between the mode 1 and the mode 2 can be replaced with a group delay time difference between the even mode and the odd mode.

[Math. 3]

$$\delta\beta = \sqrt{\Delta\beta^2 + |2\kappa|^2} \qquad (3)$$

Here, $\Delta\beta = \beta_1 - \beta_2$ is defined. Here, $\beta_1$ and $\beta_2$ are propagation constants of the mode 1 and the mode 2.

In addition, the electric field between the mode 1 and the mode 2 shown in Expression (2) can be converted into electric fields of the even mode and the odd mode orthogonal to each other, by diagonalization. That is, the electric fields of the even mode and the odd mode are obtained by converting the electric field between the mode 1 and the mode 2 into orthogonal component expression. For that reason, $\Delta_\tau$ of Expression (1) can be calculated even by using the electric fields of the even mode and the odd mode as well as the electric field between the mode 1 and the mode 2.

Thus, as $\Delta_\tau$ and $d\Delta\beta/d\omega$ in Expression (1), the spatial mode dispersion and the group delay time difference between the mode 1 and the mode 2 may be used, or the spatial mode dispersion and the group delay time difference between the even mode and the odd mode may be used. Hereinafter, a description will be given by using the spatial mode dispersion and the group delay time difference between the even mode and the odd mode.

The power coupling coefficient calculation device 13 can calculate the power coupling coefficient between cores by substituting the spatial mode dispersion acquired as the information a1, the group delay time difference acquired as the information a2, and the fiber length of the optical fiber to be tested into Expression (1).

Note that, since the group delay time difference and the spatial mode dispersion in the coupled two-core fiber have wavelength dependency, it is necessary to use the group delay time difference and the spatial mode dispersion at the same wavelength in Math. 1. In addition, it is also possible to analyze the wavelength dependency of the power coupling coefficient by acquiring the group delay time difference and the spatial mode dispersion at various wavelengths based on the wavelength change and by calculating the power coupling coefficient from the group delay time difference and the spatial mode dispersion at each of the wavelengths.

The group delay time difference acquisition device 11 according to the present embodiment may have any configuration as long as the group delay time difference between the eigenmodes is acquirable. In addition, the spatial mode dispersion acquisition device 12 according to the present embodiment may have any configuration as long as the spatial mode dispersion between the eigenmodes is acquirable. Hereinafter, configuration examples of the group delay time difference acquisition device 11 and the spatial mode dispersion acquisition device 12 will be described, but the present invention is not limited thereto.

The group delay time difference acquisition device 11 measures the group delay time difference between the eigenmodes in the optical fiber to be tested. As a means for achieving the acquisition of the group delay time difference between the eigenmodes, for example, it is possible to use a method of acquiring the group delay time difference from an interference waveform of light passing through the core 1 and the core 2 in the optical fiber to be tested, such as an interference method (See, for example, Non Patent Literature 3).

Figure 2:
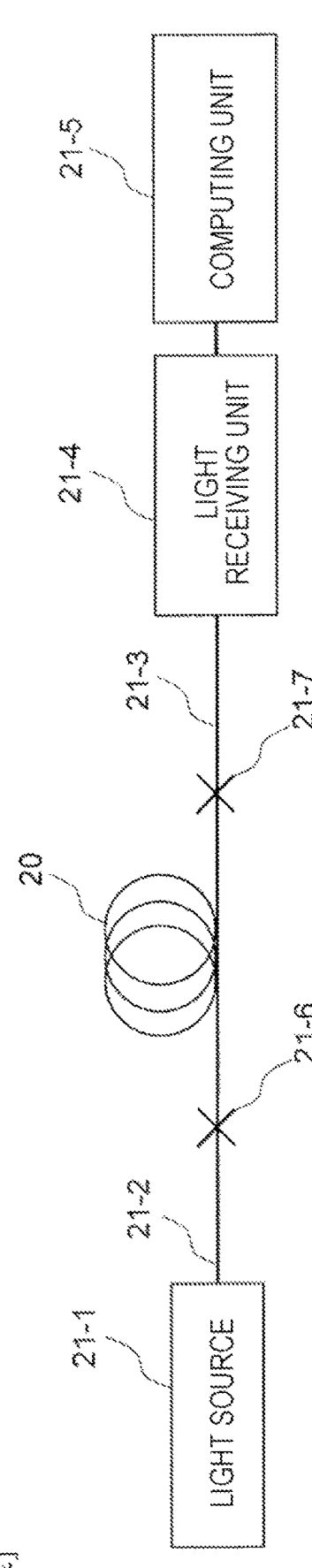
FIG. 2 illustrates an example of a schematic configuration of a device according to an embodiment.

FIG. 2 illustrates an example of a configuration of the group delay time difference acquisition device 11. As illustrated in FIG. 2, the group delay time difference acquisition device 11 includes a light source 21-1, single-core fibers 21-2 and 21-3, a light receiving unit 21-4, and a computing unit 21-5.

The single-core fiber 21-2 is fusion-spliced to one end of an optical fiber to be tested 20, and the single-core fiber 21-3 is fusion-spliced to the other end of the optical fiber to be tested 20. In FIGS. 2, 21-6 and 21-7 each denote a fusion splice point between the single-core fiber 21-2 or the single-core fiber 21-3 and the optical fiber to be tested 20. Each of the single-core fibers 21-2 and 21-3 may be fusion-spliced to the optical fiber to be tested 20 such that the central axis of the core of the single-core fiber matches the central axis of either core of the optical fiber to be tested. In addition, core diameters of the single-core fibers 21-2 and 21-3 may be the same as core diameters of cores constituting the optical fiber to be tested 20.

The group delay time difference acquisition device 11 injects light having a specific wavelength into the optical fiber to be tested by means of the light source 21-1. The group delay time difference acquisition device 11 receives the light propagated through the optical fiber to be tested by means of the light receiving unit 21-4. The group delay time difference acquisition device 11 may analyze the intensity at each time, with respect to the light having the specific wavelength received by the light receiving unit 21-4, by means of the computing unit 21-5, and may set a time difference between peaks of the intensity as the group delay time difference at the specific wavelength. In addition, the group delay time difference acquisition device 11 may acquire the group delay time difference at the specific wavelength by analyzing the frequency, with respect to the light having the specific wavelength received by the light receiving unit 21-4, by means of the computing unit 21-5. The group delay time difference acquisition device 11 may acquire the group delay time difference at each wavelength by changing the wavelength of light, injected into the optical fiber to be tested, by means of the light source 21-1.

Further, the group delay time difference acquisition device 11 may use frequency sweep optical interferometry (FMCW method). For example, as the FMCW method, continuous light linearly frequency-swept with respect to time is split, and light whose beam is one of the split beams is propagated to the optical fiber to be tested. Then, the group delay time difference may be calculated by analyzing the frequency of light resulting from interference between the light propagated through the optical fiber to be tested and light whose beam is the other of the split beams. Here, the group delay time difference obtained by the FMCW method may be a group delay time difference at a wavelength corresponding to a center frequency within a frequency width swept in the FMCW method. The group delay time difference at each wavelength may be acquired by changing a frequency region or the frequency width to be swept.

The spatial mode dispersion acquisition device 12 measures spatial mode dispersion within an entire length of the optical fiber to be tested. As a means for achieving acquisition of the spatial mode dispersion within the entire length of the optical fiber to be tested, for example, it is possible to use a method of acquiring spatial mode dispersion from a change in intensity of transmitted light (light propagated through the optical fiber to be tested) with respect to an optical frequency, such as a frequency sweep method (See, for example, Non Patent Literature 4).

Specifically, as well as the group delay time difference acquisition device 11, the spatial mode dispersion acquisition device 12 may have the configuration illustrated in FIG. 2. Examples of the light source 21-1 include a broadband light source and a wavelength-tunable light source. Examples of the light receiving unit 21-4 include an optical spectrum analyzer and a power meter.

The spatial mode dispersion acquisition device 12 receives transmitted light by means of the light receiving unit 21-4. The spatial mode dispersion acquisition device 12 converts data of transmitted light intensity with respect to a wavelength into data of transmitted light intensity with respect to a frequency and further performs the Fourier transform, by means of the computing unit 21-5. Since a frequency distribution at each time with respect to the transmitted light can be acquired by the Fourier transform, the spatial mode dispersion acquisition device 12 may acquire the spatial mode dispersion by means of obtaining a standard deviation of the frequency distribution. Here, the obtained spatial mode dispersion may be a group delay time difference at the center wavelength within a wavelength width of injected light. The group delay time difference at each wavelength may be acquired by changing a wavelength region or the wavelength width of the injected light.

The device of the present invention can also be implemented by a computer and a program, and the program can be recorded in a recording medium or provided through a network.

INDUSTRIAL APPLICABILITY

The device, the method, and the system for calculating the power coupling coefficient between cores according to the present disclosure can be applied to an information communication industry.

REFERENCE SIGNS LIST

10 Power coupling coefficient measurement system
11 Group delay time difference acquisition device
12 Spatial mode dispersion acquisition device
13 Power coupling coefficient calculation device
20 Optical fiber to be measured
21-1 Light source
21-2, 21-3 Single mode fiber
21-4 Light receiving unit
21-5 Computing unit
21-6, 21-7 Fusion splice point

The invention claimed is:

1. A method comprising:
   acquiring a group delay time difference between eigenmodes, at a specific wavelength, in a coupled two-core fiber;
   acquiring spatial mode dispersion between the eigenmodes, at the specific wavelength, in the coupled two-core fiber;
   calculating an average power coupling coefficient between cores, at the specific wavelength, within an entire length of the coupled two-core fiber by using the group delay time difference, the spatial mode dispersion, and a length of the coupled two-core fiber, wherein the power coupling coefficient is calculated by using Expression C2,

[Math. C2]

$$\Delta \tau = \frac{d\Delta\beta}{d\omega}\sqrt{\frac{L}{h}} \qquad (C2)$$

where $\Delta_\tau$ represents the spatial mode dispersion between the eigenmodes, at the specific wavelength, in the coupled two-core fiber, $d\Delta\beta/d\omega$ represents the group delay time difference between the eigenmodes, at the specific wavelength, in the coupled two-core fiber, L represents a fiber length of the coupled two-core fiber, and h represents a power coupling coefficient between cores; and
   optimizing design of the coupled two-core fiber using the power coupling coefficient.

2. A system that calculates a power coupling coefficient between cores of a coupled two-core fiber, the system comprising:
   a light source configured to inject light into the coupled two-core fiber;
   a light receiving unit configured to receive light propagating through the coupled two-core fiber;
   a processor interfaced with the light receiving unit; and
   a storage medium having computer program instructions stored thereon, when executed by the processor, perform to:
   acquire a group delay time difference between eigenmodes, at a specific wavelength, in a coupled two-core fiber using the light injected by the light source and received by the light receiving unit;
   acquire spatial mode dispersion between the eigenmodes, at the specific wavelength, in the coupled two-core fiber using the light injected by the light source and received by the light receiving unit; and
   calculate an average power coupling coefficient between cores, at the specific wavelength, within an entire length of the coupled two-core fiber by using the group delay time difference, the spatial mode dispersion, and a length of the coupled two-core fiber, wherein the power coupling coefficient is calculated by using Expression C1,

[Math. C1]

$$\Delta \tau = \frac{d\Delta\beta}{d\omega}\sqrt{\frac{L}{h}} \qquad (C1)$$

where $\Delta_\tau$ represents the spatial mode dispersion between the eigenmodes, at the specific wavelength, in the coupled two-core fiber, $d\Delta\beta/d\omega$ represents the group delay time difference between the eigenmodes, at the specific wavelength, in the coupled two-core fiber, L represents a fiber length of the coupled two-core fiber, and h represents a power coupling coefficient between cores.

3. The system according to claim 2, wherein the coupled two-core fiber has a length in which an impulse response width is widened in proportion to a square root of a distance.

4. The system according to claim 2, wherein the computer program instructions further perform to acquire the group delay time difference, at different wavelengths, individually acquire the spatial mode dispersion, at different wavelengths, individually, and calculate the power coupling coefficient, at a wavelength at which both the group delay time difference and the spatial mode dispersion are acquired.

* * * * *